United States Patent [19]

Murata et al.

[11] Patent Number: 5,149,730
[45] Date of Patent: Sep. 22, 1992

[54] EPOXY RESIN COMPOSITION

[75] Inventors: Yasuyuki Murata; Isako Konishi; Ryohei Tanaka, all of Yokkaichi; Yoshinori Nakanishi, Suzuka, all of Japan

[73] Assignee: Shell Oil Company, Houston, Tex.

[21] Appl. No.: 537,316

[22] Filed: Jun. 13, 1990

[30] Foreign Application Priority Data

Jun. 13, 1989 [JP] Japan .................................. 1-148283

[51] Int. Cl.$^5$ ...................... C08L 63/02; C08L 63/00; C08F 283/10
[52] U.S. Cl. .................................... 523/466; 525/481; 525/486; 525/485
[58] Field of Search ...................... 525/481, 486, 485; 523/466

[56] References Cited

U.S. PATENT DOCUMENTS

| | | | |
|---|---|---|---|
| 3,989,531 | 11/1976 | Orlando et al. | 106/15 FP |
| 4,058,570 | 11/1977 | Kinson et al. | 260/620 |
| 4,072,656 | 2/1978 | Hartmann | 260/47 EN |
| 4,153,621 | 5/1979 | Hartmann | 260/348.64 |
| 4,654,382 | 3/1987 | Hiza et al. | 528/98 |
| 4,663,400 | 5/1987 | Wang et al. | 528/97 |
| 4,835,240 | 5/1989 | Togashi et al. | 528/106 |
| 4,874,669 | 10/1989 | Larson et al. | 528/90 |

FOREIGN PATENT DOCUMENTS

| | | |
|---|---|---|
| 0251431 | 1/1988 | European Pat. Off. . |
| 58-39677 | 3/1983 | Japan . |
| 58-170774 | 10/1983 | Japan . |
| 61-47725 | 3/1986 | Japan . |

Primary Examiner—Melvyn I. Marquis
Assistant Examiner—Christopher P. Rogers

[57] ABSTRACT

An electrical encapsulation formulation is provided comprising a diglycidyl ether of a 4,4'-dihydroxybiphenyl, a trisphenolic curing agent, a cure accelerator and an inorganic filler. The composition cures rapidly and exhibits excellent resistance to cracking under high-temperature operation.

12 Claims, No Drawings

EPOXY RESIN COMPOSITION

BACKGROUND OF THE INVENTION

This invention relates to epoxy resin compositions. In one aspect, the invention relates to the preparation of low-stress epoxy resin compositions useful in encapsulating electrical components.

Epoxy resins are used to encapsulate electrical components such as integrated circuits. The optimum properties for encapsulation resins include low melting point in the uncured state (to permit encapsulation of the component at a relatively low temperature), high glass transition temperature in the cured state (to permit encapsulation of a component which can tolerate high operating temperatures), low modulus and low coefficient of thermal expansion of the cured resin (properties related to the ability of the cured resin to resist "stress" or cracking at high operating temperatures), and fast cure (to permit maximum speed and productivity in assembly).

One class of epoxy resin used in electrical encapsulation is epoxidized orthocresol novolac (EOCN) resins. EOCN resins have high glass transition temperatures and good moisture resistance, but they are subject to "stress" or cracking under high operating temperatures.

Another class of epoxy resins suitable for electrical encapsulation are diglycidyl ethers of 4,4'-dihydroxybiphenyls, which are typically cured with phenol novolac-type curing agents. These epoxy systems exhibit the highly desirable property combination of low melt viscosity and low modulus, the latter property being an indication of the ability of the cured composition to resist cracking during high temperature use. However, for some encapsulation applications, the glass transition temperature of these resins is low and the cure rate is slow.

It is therefore an object of the invention to provide an electrical encapsulation formulation which cures rapidly, has low modulus and cures to a high glass transition temperature.

SUMMARY OF THE INVENTION

According to the invention, an epoxy resin composition is provided comprising a diglycidyl ether of a 4,4'-dihydroxybiphenyl and a trisphenolic curing agent which is the condensation reaction product of a phenol and a hydroxyl-functional aromatic aldehyde or ketone. The invention filled molding powder formulations exhibit rapid cure and high resistance to cracking at high operating temperatures.

DETAILED DESCRIPTION OF THE INVENTION

The invention composition contains a diglycidyl ether of a 4,4'-dihydroxybiphenyl which can be described by chemical structure I:

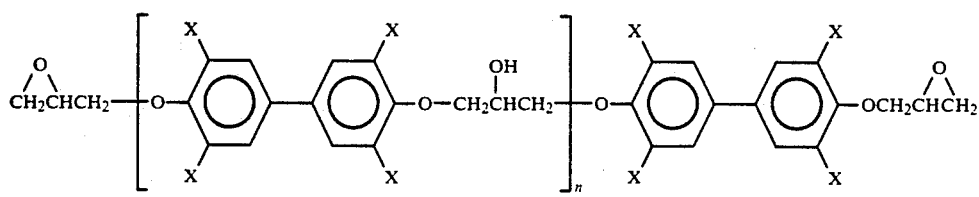

in which each X is independently selected from H, halide and $C_{1-5}$ alkyl, preferably methyl and ethyl. Such diglycidyl ethers include, for example, 4,4'-dihydroxybiphenyl; 4,4'-dihydroxy-3,3',5,5'-tetramethylbiphenyl; 4,4'-dihydroxy-3,3',5,5'-tetramethyl-2-chlorobiphenyl; 4,4'-dihydroxy-3,3',5,5'-tetramethyl-2-bromobiphenyl; and 4,4'-dihydroxy-3,3',5,5'-tetraethylbiphenyl.

Such diglycidyl ethers of dihydroxyl biphenyls can be prepared by the base-catalyzed reaction of epichlorohydrin with the precursor dihydroxybiphenyl. The reaction will typically produce a resin mixture which includes, in the above formula, species of n=0,1,2,3,4 and 5 so that the average n will be within the range of 0 to 3, preferably 0 to 2.

The epoxy component can be a mixture of the above diglycidyl ether and one or more other di-or polyglycidyl ethers, so long as the diglycidyl ether of 4,4'-dihydroxybiphenyl constitutes at least about 20, preferably at least about 50, weight percent of the epoxy component of the composition. The additional epoxy resin can be a reaction product of epichlorohydrin and various phenols such as bisphenol-A, bisphenol-F, resorcine; hydroquinone; methylresorcine; phenol novolac; cresol novolac; resorcine novolac; bisphenol-A novolac; and trifunctional and tetrafunctional epoxy resins which can be represented by structure II:

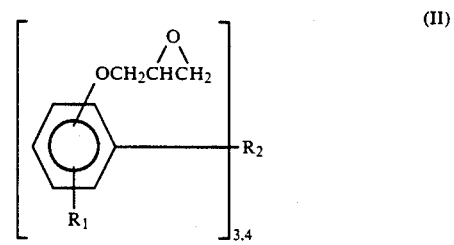

in which $R_1$ and $R_2$ each represent a $C_{1-10}$ hydrocarbon group.

The invention composition includes a trisphenolic curing agent which is the product of the condensation reaction of a phenol with a phenolic hydroxyl group-containing aromatic aldehyde or ketone. Preferred trisphenolics can be represented by the formula

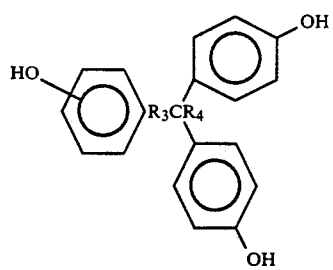

in which $R_3$ is a direct bond or $C_{1-4}$ alkylene and $R_4$ is H or $C_{1-4}$ alkyl. Such polyphenols can be prepared by the acid-catalyzed condensation reaction of 0.1 to about 3.0 moles of a phenolic hydroxyl group-containing aromatic aldehyde or aromatic ketone. The phenol can be, for example, phenol, cresol, xylenol, ethylphenol, butylphenol, phenylphenol, nonylphenol, butylcresol, bromophenol, chlorophenol, hydroquinone, resorcinol, bisphenol-A, bisphenol-F, bisphenol, and the like. Examples of the phenolic hydroxyl group-containing aromatic aldehydehydes and ketones include, for example, hydroxybenzaldehyde, methylhydroxybenzaldehyde, methoxyhydroxybenzaldehyde, hydroxyacetophenone, hydroxyphenylethylketone, and the like. The acid catalyst can include, for example, inorganic acids such as hydrochloric acid and sulfuric acid; organic acids such as oxalic acid and toluene sulfonic acid; and acid-functioning organic acid salts. Such acid catalysts are typically present in the reaction mixture in an amount of about 0.1 to about 5 parts by weight per 100 parts by weight of the phenol.

The above-described trisphenolic compound can be used in combination with other phenolic compounds but will constitute at least about 20 weight percent, preferably at least about 40 weight percent, of the phenolic curing agent for the invention composition.

The phenolic curing agent is present in the invention composition in an amount within the range of about 20 to about 200 weight percent, based on the weight of the diglycidyl ether. Preferably, the two components are blended so that there is about 0.5 to about 2.0, preferably about 1, phenolic hydroxyl group per epoxy group.

The invention encapsulation formulation will preferably include a curing accelerator for accelerating cure of the epoxy resin. Suitable cure accelerators include tertiary amines such as 2-(dimethylaminomethyl)phenol, 2,4,6-tris(dimethylaminomethyl)phenol, benzyldimethylamine, α-methylbenzyldimethylamine; imidazoles such as 2-methylimidazole, 2-phenylimidazole, 2-undecylimidazole, 2-heptadecylimidazole, and 2-ethyl-4-methylimidazole; and phosphines such as triphenyl phosphine. The accelerator will generally be present in the composition in an amount of about 0.02 to about 1.0 weight percent, based on the weight of the epoxy resin.

The invention encapsulation formulation further includes an inorganic filler such as, for example, fused silica powder, crystalline silica powder, quartz glass powder, talc, calcium silicate powder, zirconium silicate powder, alumina powder, calcium carbonate powder, clay powder, borium sulfate powder and glass fibers, with silica powder being preferred. The inorganic filler component will generally be present in an amount within the range of about 50 to about 90 weight percent, based on the weight of the composition, in order to maintain an acceptably low coefficient of linear expansion and acceptable handling viscosity.

The encapsulation composition can include various additives such as mold release agents, including natural wax, higher fatty acids, metal salts of higher fatty acids and paraffins; pigments including carbon black; coupling agents and fire retardants, including antimony trioxide, antimony pentoxide, and phosphorus.

The components of the encapsulation composition are preferably mixed by melt-blending finely-ground particles.

EXAMPLE 1

This example illustrates the preparation of a diglycidyl ether of 4,4'-dihydroxy-3,3',5,5'-tetramethylbiphenyl. Into a 5-L three-neck flask equipped with a stirrer, a thermometer and a cooler were charged 4,4'-dihydroxy-3,3',5,5'-tetramethylbiphenyl (242 g, 1.0 mol), epichlorohydrin (2,220 g, 24 mols) and tetramethylammonium chloride (1.9 g), so as to effect the addition reaction thereof under heat-refluxing for two hours. The contents of the flask were cooled to 60° C. and, after a moisture remover was equipped therewith, sodium hydroxide (88 g, 2.2 mols) was added to effect the ring-closure reaction thereof at a reaction temperature in the range of from 55° to 60° C. and a reduced pressure in the range of from 100 to 150 mmHg, while the resulting water was continuously and azeotropically removed. The instant at which the amount of the resulting water reached 3.6 ml was determined to be completion of the reaction (after about two hours).

The reaction product was filtered under reduced pressure, and the filtered product was repeatedly washed with water in a mixer to remove NaCl. The filtrate was distilled at reduced pressure to recover unreacted epichlorohydrin.

330 g of 4,4'-bis(2,3-epoxypropoxy)-3,3',5,'-tetramethylbiphenyl having an epoxy equivalent of 185 g/eq and a melting point of 105° C. was obtained in a solid form having a light yellow color. This compound had general formula (I) wherein n is 0.06 on average. This material is referred to as Epoxy Resin I in Table 1.

EXAMPLE 2

This example illustrates the preparation of the diglycidyl ether of 4,4'-dihydroxybiphenyl, which was carried out in a manner similar to that of Example I, starting with 186 g (1.0 mol) of 4,4'-dihydroxybiphenyl. The product was 27.3 g of 4,4'-bis(2,3-epoxypropoxy)biphenyl having an epoxy equivalent of 157 g/eq and a melting point of 151° C. This compound has general structure I wherein n is 0.04 on average and will be referred to as Epoxy Resin II in Table 1.

EXAMPLE 3

This example illustrates the preparation of a trisphenolic curing agent. Into a 5-L. four neck flask equipped with a thermometer, a stirrer and a cooler were charged phenol (3,290 g), p-hydroxybenzaldehyde (854 g), and p-toluene sulfonic acid (8.5 g) so as to effect the reaction thereof at 150° C. for five hours. The reaction mixture was then subjected to further condensation under heating at reduced pressure in the range of from 50 to 80 mmHg, while water and unreacted phenol were continuously removed from the reaction system. When the thus-formed water reached an amount of 123 g, the reaction pressure was lowered to a value of 0.5 to 1 mmHg to completely remove excess phenol from the reaction system. 1,750 g of a polyphenol was obtained in the form of a red-brown solid having a softening point of 118° C. and a hydroxyl group equivalent of 99. This compound is referred to as Polyphenol A in Table 1.

EXAMPLE 4

This example illustrates the preparation of a second trisphenolic curing agent. A reaction such as was carried out in Example 3 was repeated using o-cresol (3,024 g) and p-hydroxyacetophenone (952 g) as starting reactants. 200 g of a polyphenol having a softening point of 104° C. and a hydroxyl group equivalent of 108 were produced. The product is referred to as Polyphenol B in Table 1.

EXAMPLE 5

The compositions shown in Table 1 were prepared by melt-blending the indicated epoxy resin(s) with the indicated phenol(s), with the use of a mixing roll at a temperature of about 90°-110° C. for five minutes. The melt-mixed mixture was formed into a sheet, cooled and ground into a molding powder. Bending test pieces were prepared in a low-pressure transfer molding machine at 180° C. and a molding time of 180 seconds, and encapsulating dummy elements were postcured for eight hours at 180° C.

Glass transition points, thermal resistance under soldering and bending modulus determined on each molded test piece are shown in Table 1. As can be seen from the test results, the use of an epoxy resin derived from a 4,4'-dihydroxybiphenyl and a trisphenolic curing agent results in an encapsulation formulation which has reduced cure time (see, for example, Run 1 and Comp. Run 2) and superior high-temperature resistance to cracking (see Run 1 versus Comp. Runs 1 and 3).

TABLE I

| Formulations (parts by weight) | Runs | | | | | Comparative Runs | | |
|---|---|---|---|---|---|---|---|---|
| | 1 | 2 | 3 | 4 | 5 | 1 | 2 | 3 |
| Epoxy Resin I | 100 | 50 | 50 | 100 | — | — | 100 | — |
| Epoxy Resin II | — | — | 50 | — | 50 | — | — | — |
| EOCN Epoxy Resin[1] | — | 50 | — | — | 50 | 100 | — | 100 |
| Polyphenol A | 56 | 54 | — | 28 | 58 | — | — | 52 |
| Polyphenol B | — | — | 66 | — | — | — | — | — |
| Phenol Novolac Resin[2] | — | — | — | 28 | — | 54 | 58 | — |
| Brominated Bisphenol A-type Epoxy Resin | 10 | 10 | 10 | 10 | 10 | 10 | 10 | 10 |
| Triphenylphosphine | 1.0 | 1.0 | 1.0 | 1.0 | 1.0 | 1.0 | 1.0 | 1.0 |
| Silica Powder | 387 | 383 | 411 | 387 | 392 | 383 | 392 | 378 |
| Antimony Trioxide | 10 | 10 | 10 | 10 | 10 | 10 | 10 | 10 |
| Carnauba Wax | 1.0 | 1.0 | 1.0 | 1.0 | 1.0 | 1.0 | 1.0 | 1.0 |
| Epoxy Silane | 1.0 | 1.0 | 1.0 | 1.0 | 1.0 | 1.0 | 1.0 | 1.0 |
| Test Results | | | | | | | | |
| Gel time at 150° C. (sec.)[4] | 210 | 193 | 201 | 221 | 188 | 195 | 292 | 172 |
| Glass transition point (°C.)[5] | 168 | 182 | 179 | 162 | 189 | 165 | 143 | 193 |
| Thermal resistance under soldering[6] | 0/16 | 2/16 | 0/16 | 0/16 | 1/16 | 13/16 | 0/16 | 9/16 |
| Bending modulus (kg/mm$^2$) | 1490 | 1530 | 1420 | 1440 | 1480 | 1560 | 1430 | 1620 |

[1]EPIKOTE ® 180 H65 orthocresol novolac epoxy resin from Yuka Shell Epoxy K.K.
[2]Phenol novolac (softening point 85° C.) from Gunei Chemical K.K.
[3]EPIKOTE ® 5050 (EEW 385 and Br content 49%) from Yuka Shell Epoxy.
[4]Hotbench test.
[5]Determined from the transition point of thermal expansion curve using TMA.
[6]Crack formation in 16 flat plastic packages (44 pin FPP) exposed to moisture at 85° C. and 85% RH for 168 hours, followed by treatment at 215° C. under vapor phase flow for 90 seconds.

We claim:

1. An electrical encapsulation composition comprising:

(a) a diglycidyl ether which can be represented by the formula in which each X is independently selected from H, halide and $C_{1-5}$ alkyl, and n has an average valve within the range of 0 to about 3;

(b) a curing amount of a trisphenolic curing agent which is the product of reacting, in the presence of an acid condensation reaction catalyst, a substituted or unsubstituted phenolic hydroxyl group-containing aromatic aldehyde or ketone and a substituted or unsubstituted phenol;

(c) an accelerating amount of a cure accelerator; and (d) at least about 50 weight percent, based on the weight of the composition, of an inorganic filler.

2. The composition of claim 1 in which the phenolic hydroxyl group-containing aromatic aldehyde or ketone is selected from the group consisting of hydroxybenzaldehyde, methylhydroxybenzaldehyde, methoxyhydroxybenzaldehyde, hydroxyacetophenone, and hydroxyphenylethylketone.

3. The composition of claim 2 in which the phenol is selected from the group consisting of phenol, cresol, xylenol, ethylphenol, butylphenol, phenylphenol, nonylphenol, butylcresol, bromophenol, chlorophenol, hydroquinone, resorcinol, bisphenol-A, bisphenol-F and biphenol.

4. The composition of claim 1 in which the diglycidyl ether is selected from diglycidyl ethers of 4,4'-dihydroxybiphenyl and 4,4'-dihydroxy-3,3',5,5'-tetramethylbiphenyl.

5. The composition of claim 4 in which the trisphenolic curing agent is the reaction product of hydroxybenzaldehyde and phenol.

6. The composition of claim 4 in which the trisphenolic curing agent is the reaction product of p-hydroxyacetophenone and phenol.

7. The composition of claim 4 in which the accelerator is triphenylphosphine.

8. The composition of claim 1 in which the filler comprises silica.

9. The composition of claim 1 which further comprises up to about 50 weight percent, based on the weight of epoxy components, of a second epoxy resin.

10. The composition of claim 1 in which the trisphenolic curing agent is present in an amount within the range of about 20 to about 200 weight percent, based on the weight of the diglycidyl ether.

11. A process for increasing the cure rate of a phenolic-cured electrical encapsulation composition comprising a diglycidyl ether of 4,4'-bishydroxybiphenyl, the process comprising incorporating in the composition a trisphenolic curing agent which is the product of the acid-catalyzed condensation reaction of a substituted or unsubstituted phenolic hydroxyl group-containing aromatic aldehyde or ketone and a substituted or unsubstituted phenol.

12. An article of manufacture comprising an electrical component and the cured composition of claim 1.

* * * * *